United States Patent Office 3,136,094
Patented June 9, 1964

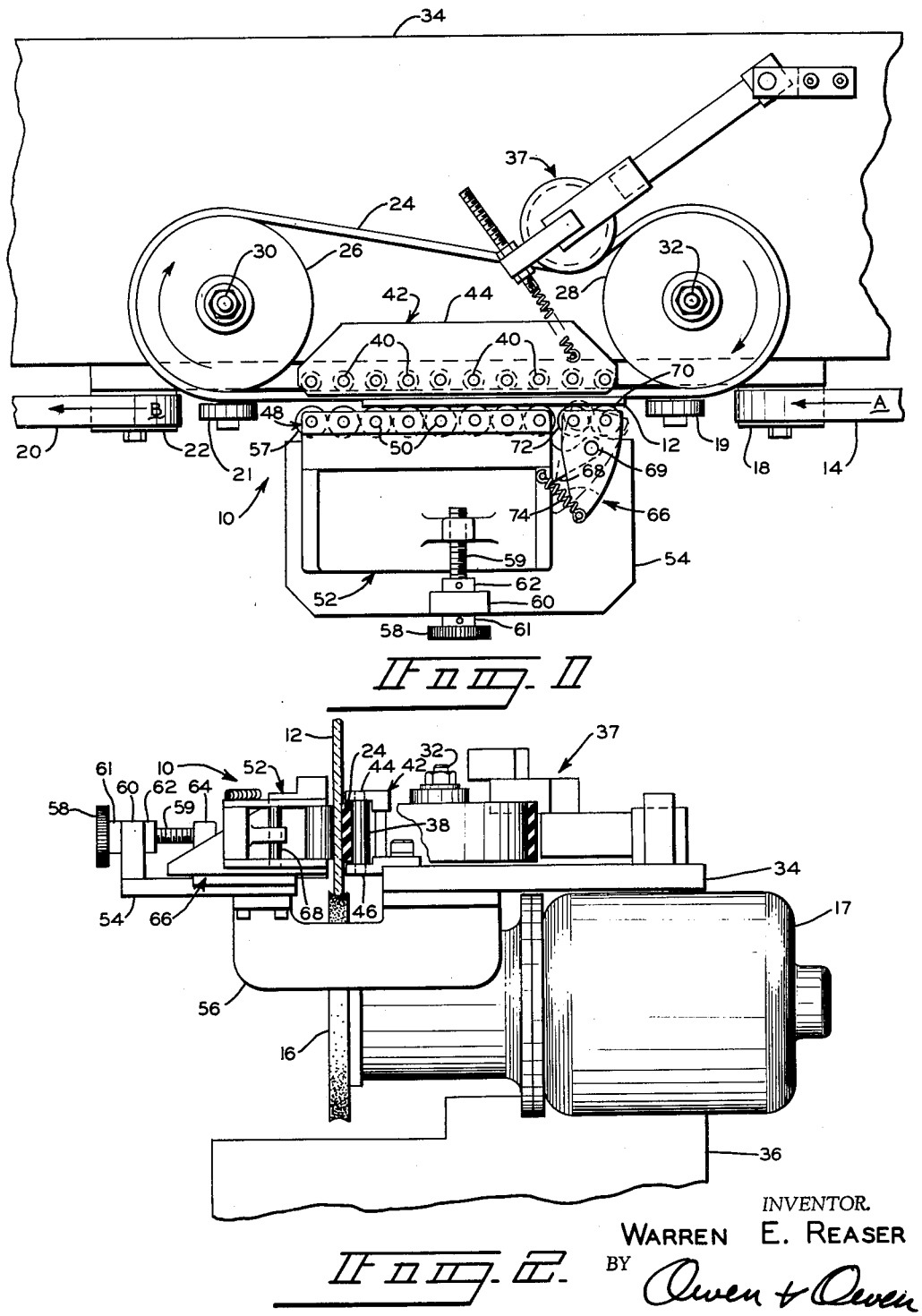

3,136,094
APPARATUS FOR FEEDING GLASS SHEETS IN AN EDGE GRINDING MACHINE
Warren E. Reaser, Toledo, Ohio, assignor to The Sun Tool and Machine Company, Toledo, Ohio, a corporation of Ohio
Filed Dec. 11, 1961, Ser. No. 158,256
2 Claims. (Cl. 51—76)

The present invention is concerned with an edge seamer for glass sheets or plates, and more particularly with apparatus for supporting and moving pattern-cut glass sheets over an edge grinding wheel.

Edge seamers which are used to grind the edge of glass sheets have a general structural arrangement which includes at least one grinding wheel for contacting the edges of the sheets, means for spraying a liquid coolant on the grinding wheel and sheets, and a feeding device for gripping the sheets while moving them along the grinding wheel. It is desirable that the feeding device support the glass sheets in a generally vertical position to reduce the space occupied by the seamer and to facilitate movement of the sheets without breakage. The feeding device should grip the glass sheets with the greatest possible resistance to displacement during grinding to prevent the coolant covered sheets which are slippery from moving away from the wheel because of the pressure exerted on their edges and to move the glass sheets along the feeding path into engagement with the grinding wheel.

When the glass sheet to be seamed had a straight edge it was proposed to use large power driven rollers to grip the opposite surfaces of the sheet as the straight edge was moved along the feeding path into engagement with the grinding wheel. The friction between the rollers and the sheet was relied upon to hold the sheet in the feeding path and to prevent its displacement by the force of the grinding wheel against the straight edge. While adequate pressure could be obtained by using the large power driven rollers, the alignment of the rollers had to be very accurately maintained to prevent "snaking" of the glass sheets as they moved between the rollers; that is, the glass sheets were angularly shifted relative to the planes of their faces or to the proper feeding path. This "snaking" caused the sheet edges to engage the grinding wheel at improper angles and fractured the glass when the stresses became excessive. Also it was necessary to provide structure synchronizing the rotation of the rollers.

Other feeding devices having a pair of power driven belts on either side of the glass sheet have been used. In such a feeder complicated structures were utilized to maintain the surfaces of opposed belts in contact with the glass, and the speed of the belts had to be synchronized to prevent the surface of the glass from being scratched.

The problem of scratching was solved by utilizing a feeder in which only one of the belts was power driven, the other belt being driven by the movement of the glass sheet along the grinding wheel. However, in this device it was difficult to maintain adequate pressure between the two belts to insure synchronous movement, especially when the belts became slippery from the coolant sprayed on the glass sheet during grinding.

It is, therefore, an object of the invention to provide an improved feeding device for a vertical glass seamer which utilizes high gripping pressures and maintains the sheet in its proper path across the grinding wheel.

Another object of the invention is to provide an improved feeding device for a vertical glass seamer which is easily manufactured and has a minimum power requirement.

Still another object of the invention is to provide an improved feeding device for a vertical glass seamer which has improved means for guiding the glass sheets at the entry side thereof.

Other and more specific objects and advantages of the invention will be apparent from the specification and drawings which follow in which like numbers are used throughout to identify like parts.

FIG. 1 is a plan view of a portion of an automatic edge seamer for pattern-cut glass sheets showing the improved feeding apparatus of the invention utilized therein; and FIG. 2 is an end elevation view with parts broken away of the feeding apparatus taken from the right-hand side of FIG. 1.

The above objects are achieved by providing an endless, power driven belt on one side of the predetermined feeding path for pattern-cut glass sheets as their bottom edges are moved into engagement with the grinding wheel. A plurality of resilient rollers are mounted for rotation about axes that are parallel to the feeding path, and these rollers are spaced from the belt a distance less than the thickness of the glass sheets so that the rollers press the glass sheets against the belt. A roller carrying bracket is tiltably mounted at the entry side of the feeding device to guide the glass sheets between the rollers and the belt.

The improved feeding device, indicated generally by the reference numeral 10, is illustrated in the drawing as being used with a typical glass edge seamer which may be of the general type disclosed in United States Patent No. 2,826,007. A pattern-cut glass sheet 12 having sharp, unground edges is supported in an upright position that is preferably tilted at a small angle relative to the vertical, although for clarity the sheet 12 shown in the drawings is illustrated as being vertical. Suitable supports, such as rollers (not shown) may engage one of the sheet's surfaces to maintain the sheet 12 in the upright position, and a feeding belt 14 engages the lower edge of the sheet 12 to carry it to a work station along a predetermined feeding path indicated by the arrow A in FIG. 1. The feeding belt 14 carries the sheet 12 into the feeding device 10 which likewise moves the sheet along predetermined feeding path into engagement with at least one grinding wheel 16 located below the feeding device 10 and driven by a motor 17 as shown in FIG. 2. The feeding belt 14 is supported adjacent the feeding device 10 by a pulley 18 while a freely rotating wheel 19 supports the sheet 12 immediately prior to entering the feeding device 10.

After the bottom edge has been ground by the wheel 16, the sheet 12 moves onto a discharge belt 20 which carries the sheet away from the feeding device 10 along a predetermined path as indicated by the arrow B in FIG. 1. A freely rotating wheel 21 supports the sheet 12 prior to engagement with the belt 20 upon discharge from the feeding device 10. The discharge belt 20 is supported adjacent the feeding device 10 by a pulley 22 that is similar to the pulley 18, and both pulleys 18 and 22 are tilted so that the surfaces of the belts 14 and 20 are tilted relative to the horizontal at an angle equal to the angle at which the sheet 12 is positioned relative to the vertical.

The glass feeding device 10 comprises a belt 24 of rough, woven material, such as canvas, that is mounted on a drive pulley 26 and an idler pulley 28 as shown in FIG. 1. Parallel shafts 30 and 32, having threaded end portions of reduced diameter for receiving nuts or other suitable securing devices, extend through enlarged hub portions at the centers of the pulleys 26 and 28 respectively to mount these pulleys for rotation about parallel axes that are spaced from and parallel to the plane along which the sheets 12 are fed. The shaft 32 is rotatably mounted on a support 34 that is carried by a frame 36. The drive pulley 26 is driven by a motor or any other convenient device mounted on the underside of the support 34. The belt 24 is maintained in driving engagement with the pulleys 26 and 28 by a tensioning device 37 such as a spring loaded pulley that is pivotally mounted on the support 34.

The angle at which the device 10 is tilted relative to the horizontal is determined by the construction of the frame 36 which is usually solidly anchored. For simplicity of illustration, the direction of the planes are shown as horizontal and vertical, the backward tilt, as mentioned, being determined by the frame 36.

The surface of the belt 24 which is opposite the sheet 12 engages a plurality of vertically extending rollers 38, each of which is carried by a shaft 40. A bracket 42 comprising a top plate 44 spaced from and carried by a bottom plate 46 mounts the shafts 40 for free rotation about parallel axes as shown in FIG. 1. A forwardmost portion of each of the plates 44 and 46 extends beyond the periphery of the rollers 38 to form a guide for the span of the belt 24 along the feeding path between the pulleys 26 and 28, and the bottom plate is rigidly secured to the support 34. Not only does the bracket 42 position the rollers 38 to support the span of the belt 24 between the pulleys 26 and 28, but also this bracket maintains this span substantially straight and parallel to the feeding path of the sheet 12. The pulleys 26 and 28, as well as the bracket 42, are so positioned that the glass engaging surface of the belt 24 moves along the predetermined feeding path of movement of the glass sheet 12 above the plane of the upper surfaces of the feeding belt 14 and the discharge belt 20.

The glass feeding device 10 further comprises a plurality of vertically extending rollers 48 for engaging the surface of the glass sheet 12 opposite the surface that is engaged by the belt 24 to press the sheet against the belt. Each roller 48 is carried by a shaft 50, and an assembly of rollers 48 is carried by a bracket 52 which maintains the rollers 48 in spaced parallel relationship. The bracket 52 is carried by a plate 54, the upper surface of which is maintained substantially parallel with the upper surface of the support 34 by a pair of generally U-shaped brackets 56 located on either side of the grinding wheel 16. Each of the U-shaped brackets 56 is secured to the underside of the support 34 as shown in FIG. 2.

The rollers 48 are spaced from the portion of the belt 24 that is supported by the bracket 42 a distance substantially less than the thickness of the glass sheet 12 so that the rollers 48 press the sheet against the belt, and an important feature of the invention is that each of the rollers 48 has a resilient covering 57, for example, neoprene or the like, molded thereon. This resilient covering 57 may be fiber impregnated for maximum gripping of the coolant covered glass sheet 12 as it proceeds through the feeding device 10. Because of the resiliency of the covering, the rollers 48 will readily accommodate variations in glass thickness without the necessity of adjusting the bracket 52, and these thickness variations may be as great as $\frac{1}{32}$ inch.

When the thickness of the glass passing through the edge seamer is changed the spacing between the brackets 42 and 52 is selectively altered by rotating a hand knob 58 on the end of a shaft 59 that extends through an upwardly extending support arm 60 on the plate 54. The shaft 59 is freely rotatable within the rigid arm 60 while endwise movement is prevented by collars 61 and 62. The end of the shaft 59 opposite the knob 58 is threaded and is threadably received in a boss 64 on the bracket 52.

It is desirable to grip the glass sheet 12 with as much pressure as possible to enable maximum grinding wheel pressures to be utilized against the bottom edge of the sheet, and as stated above this is accomplished by spacing the rollers 48 from the belt 24 a distance substantially less than the thickness of the sheet 12. This spacing is usually quite small and entry of the sheet 12 between the rollers 48 and the belt 24 from the belt 14 is not readily realized because the leading edge of the sheet 12 merely abuts against the first roller 48.

Accordingly an important feature of the invention is the provision of a movable bracket 66 at the entry end of the feeding device 10 that is pivotally mounted on an arm 68 that extends toward the feeding belt 14 from the bracket 52. The movable bracket 66 is free to swing about a pin 69 in the arm 68 and carries a pair of rollers 70 and 72 which are identical with the rollers 48 for engaging the surface of the glass sheet 12.

A tensioned spring 74 moves the bracket 66 to a sheet receiving position indicated by the dotted lines in FIG. 1 that is angularly disposed to the feeding path of the glass sheet 12 by swinging the end of the bracket 66 remote from the rollers 70 and 72 toward the bracket 52. Upon entry of the sheet 12 into the feeding device 10 from the feeding belt 14 the glass fails to engage the first roller 70 because of the location of the pin 69 and contacts the second roller 72 which rotates the bracket 66 together with the rollers 70 and 72 into alignment with the remaining rollers 48. This swinging action is opposed to the force exerted by the spring 74 and brings the first roller 70 into contact with the surface of the glass. When the trailing edge of the glass moves out of engagement with the second roller 72 the spring 74 again swings the movable bracket 66 to its glass receiving position.

It is apparent that because the pin 69 is positioned in a plane between the rollers 70 and 72 the glass sheets will be properly guided into the space between the rollers 48 and the belt 12 whether the sheets are butted against one another or spaced a distance greater than the distance between the rollers 70 and 72. While the preferred embodiment of the invention has been shown and described, various modifications may be made to the feeding device without departing from the spirit of the invention or the scope of the subjoined claims.

I claim:

1. In a seamer having an abrasive wheel for grinding edges of a glass sheet during movement thereof along a predetermined feeding path with an edge of said sheet in engagement with the wheel; the improvement comprising, a plurality of rollers rotatably mounted on parallel axes all lying in a plane parallel to and extending along said feeding path adjacent said wheel, means for supporting a portion of a belt in a plane parallel to the plane of the axes of said rollers and on the other side of said feeding path, means for positively driving said belt along said feeding path, and resilient means for maintaining said belt and said rollers in engagement with the glass sheet whereby said rollers are driven by said belt through frictional engagement with the glass sheet.

2. In apparatus for moving glass sheets along a predetermined feeding path into engagement with a grinding wheel; a driven belt having a surface portion lying in a plane at one side of and parallel to said feeding path, at least one resilient roller mounted on an axis extending parallel to said plane and normal to said path, said axis being spaced from said portion of said belt a distance such that the surface of said roller lies at a distance from said plane that is less than the thickness of one of said glass sheets, whereby said sheets are maintained in engagement with said driven belt, a pivotally mounted member for guiding said glass sheet between said roller and said belt, said member comprising at least one roller mounted on an axis parallel to the axis of said first mentioned roller and a surface for frictionally engaging said glass sheets.

References Cited in the file of this patent

UNITED STATES PATENTS

| 1,651,897 | Linderman | Dec. 6, 1927 |
| 1,786,779 | Quick | Dec. 30, 1930 |
| 2,732,590 | Le Clercq | Jan. 31, 1956 |
| 2,826,007 | Reaser | Mar. 11, 1958 |
| 3,007,288 | Brewin | Nov. 7, 1961 |
| 3,010,565 | Pasinski | Nov. 28, 1961 |